United States Patent
Leong et al.

(10) Patent No.: US 10,373,373 B2
(45) Date of Patent: Aug. 6, 2019

(54) SYSTEMS AND METHODS FOR REDUCING THE STIMULATION TIME OF PHYSICS BASED GARMENT SIMULATIONS

(71) Applicant: STYLEME LIMITED, Hong Kong (HK)

(72) Inventors: Jonathan Zhan Hua Leong, Taipei (TW); Ying-Hung Chen, Santa Ana, CA (US); Tsung-Chih Tsai, New Taipei (TW)

(73) Assignee: STYLEME LIMITED, Hong Kong (HK)

( * ) Notice: Subject to any disclaimer, the term of this patent is extended or adjusted under 35 U.S.C. 154(b) by 73 days.

(21) Appl. No.: 15/806,269

(22) Filed: Nov. 7, 2017

(65) Prior Publication Data

US 2019/0139303 A1    May 9, 2019

(51) Int. Cl.
*G06F 17/50* (2006.01)
*G06T 17/00* (2006.01)
*G06T 17/20* (2006.01)

(52) U.S. Cl.
CPC .......... *G06T 17/20* (2013.01); *G06F 17/5009* (2013.01); *G06T 17/005* (2013.01); *G06T 2210/16* (2013.01)

(58) Field of Classification Search
None
See application file for complete search history.

(56) References Cited

U.S. PATENT DOCUMENTS

| 6,546,309 B1 | 4/2003 | Gazzuolo |
| 8,654,121 B1 | 2/2014 | Yu et al. |

(Continued)

FOREIGN PATENT DOCUMENTS

| CN | 102567602 A | 7/2012 |
| CN | 202615450 U | 12/2012 |

(Continued)

OTHER PUBLICATIONS

"Algorithm—Find Whether Two Triangles Intersect or Not," Stack Overflow, http://stackoverflow.com/questions/7113344/find-whether-two-triangles-intersect-or-not, printed Jan. 17, 2018. 2 pages.

(Continued)

*Primary Examiner* — Frank S Chen
(74) *Attorney, Agent, or Firm* — Duane Morris LLP

(57) ABSTRACT

Systems and methods are provided for enabling the reduction of the time required to simulate a garment fitting onto a destination body shape with high visual quality, while also offering high performance and accuracy. The embodiments described herein include, for example, caching of source body meshes having a geometric difference with a destination body mesh that is within a predefined threshold. At least one of the cached source body meshes is selected, based, at least in part, on a wearable measurement range of the garment. For each of the selected cached source body meshes, a deformable object mesh representing the garment is generated, wherein the generating is based, at least in part, on the selected cached source body mesh. A source body mesh having body measurements that most closely match the body measurements of the destination body mesh is identified from among the selected cached source body meshes.

20 Claims, 8 Drawing Sheets

(56) References Cited

U.S. PATENT DOCUMENTS

| | | | |
|---|---|---|---|
| 2009/0115777 A1 | 5/2009 | Reyers Moreno | |
| 2009/0182786 A1* | 7/2009 | Haanpaa | G06F 16/248 |
| 2010/0111370 A1* | 5/2010 | Black | G06K 9/00369 |
| | | | 382/111 |
| 2011/0298897 A1 | 12/2011 | Sareen et al. | |
| 2012/0062555 A1 | 3/2012 | O'Connor et al. | |
| 2012/0095589 A1 | 4/2012 | Vapnik | |
| 2013/0057544 A1 | 3/2013 | Oh | |
| 2014/0035913 A1 | 2/2014 | Higgins et al. | |
| 2014/0279289 A1 | 9/2014 | Steerman | |
| 2014/0368499 A1 | 12/2014 | Kaur | |
| 2015/0154691 A1 | 6/2015 | Curry et al. | |
| 2015/0269291 A1 | 9/2015 | Sekine et al. | |
| 2016/0063588 A1 | 3/2016 | Gadre et al. | |
| 2017/0161948 A1 | 6/2017 | Hua et al. | |
| 2018/0240280 A1* | 8/2018 | Chen | G06T 7/564 |

FOREIGN PATENT DOCUMENTS

| | | |
|---|---|---|
| CN | 105427386 A | 3/2016 |
| CN | 105678838 A | 6/2016 |
| CN | 106096130 A | 11/2016 |
| KR | 10-2015-0097903 A | 8/2015 |
| WO | 2014-022608 A2 | 2/2014 |

OTHER PUBLICATIONS

Barnett, "Online clothes-shopping: Is an avatar the answer?," Feb. 29, 2012, http://www.theguardian.com/fashion/shortcusts/2012/feb/29/online-clothes-shopping-avatar. 3 pages.

Bartle et al., "Physics-driven Pattern Adjustment for Direct 3D Garment Editing," 2016, ACM Transactions on Graphics (ACM Siggraph 2016). 11 pages.

Ben-Chen et al., "Variational Harmonic Maps for Space Deformation," ACM Transactions on Graphics, 2009 (ACM Siggraph 2009). 11 pages.

Berthouzoz et al., "Parsing Sewing Patterns into 3D Garments," 2013, ACM Transactions on Graphics (ACM Siggraph 2013). 11 pages.

"Body Labs," https://www.bodylabs.com/, printed Jan. 17, 2017. 4 pages.

Botch et al., "On Linear Variational Surface Deformation Methods," IEEE TVCG 14, 1, 2008, pp. 213-230.

Botch et al., "Polygon Mesh Processing," 2010. 1 page.

"Bounding Volume," http://en.wikipedia.org/wiki/Bounding_volume, printed Jan. 17, 2017. 6 pages.

Brouet et al., "Design preserving Garment Transfer," 2012, (ACM Siggraph 2012). 12 pages.

"CLO 3D Fashion Design Software," http://clo3d.com/, printed Jan. 17, 2017. 1 page.

Decaudin et al., "Virtual Garments: A Fully Geometric Approach for Clothing Design," Eurographics, 2006, vol. 25, No. 3. 10 pages.

"Fashionme," Retrieved on May 13, 2016, http://cordis.europa.eu/project/ren/54101_en.html. 3 pages.

Hauswiesner et al., "Free Viewpoint Virtual Try-On With Commodity Depth Cameras," Retrieved on May 13, 2016, http://www.icg.tugraz.at/kinectclothpaper. 8 pages.

Hinderer et al., "A Platform for Fashion Shopping with individualized Avatars and Personalized Customer Consulting," Apr. 12, 2016, Research Gate, pp. 1-7.

Khalil, "The 3D virtual environment online for real shopping," 2015, Computer Science and Information Technology Department, Computer Solution Center, arXiv:1512.02372. 7 pages.

Lipman et al., "Linear Rotation-invariant Coordinates for Meshes," ACM Transactions on Graphics, 2005. 9 pages.

Meng et al., "Flexible Shape Control for Automatic Resizing of Apparel Products," CAD 44, 2012, pp. 1-10. 10 pages.

Muller et al., "Air Meshes for Robust Collision Handling," 2015, ACM Transactions on Graphics (TOG)—Proceedings of ACM Siggraph 2015, pp. 1-9. 9 pages.

"Optitex Fashion Design Software, 3D Virtual Photocopying," http://optitex.com/, printed Jan. 17, 2017. 5 pages.

PCT International Search Report and Written Opinion dated Nov. 29, 2017 in International Application No. PCT/IB2017/000968. 8 pages.

Randall, "Fashion ecommerce: are virtual fitting rooms the silver bullet?," Feb. 9, 2015, https://econsultancy.com/blog/66058-fashion-ecommerce-are-virtual-fitting-rooms-the-silver-bullet. 10 pages.

Sorkine et al., "As-Rigid-AS-Possible Surface Modeling," Proceedings of the Eurographics Symposium on Geometry Processing, 2007, pp. 109-116.

Sorkine et al., "Lapracian Surface Editing," Proceedings of the Eurographics Symposium on Geometry Grocessing, 2004, pp. 179-188.

Tang et al., "Fast Continuous Collision Detection Using Deforming Non-Penetration Filters," 2010, Proceedings of the 2010 ACM Siggraph Symposium on Interactive 3D Graphics and Games. 7 pages.

Umetani et al., "Sensitive Couture for Interactive Garment Modeling and Editing," 2011, ACM Transactions on Graphics (ACM Siggraph 2011). 11 pages.

Volino et al., "From Early Virtual Garment Simulation to Interactive Fashion Design," Computer-Aided Design 37, Sep. 15, 2004, pp. 593-608.

Zolfagharifard, "Is this the end of changing rooms? App creates a virtual reality fitting service for shoppers to 'try on' clothes," Jun. 17, 2015, Dailymail.com. 4 pages.

* cited by examiner

SYSTEMS AND METHODS FOR REDUCING THE STIMULATION TIME OF PHYSICS BASED GARMENT SIMULATIONS

I. BACKGROUND

Physics based simulation has become an active research field in computer graphics and can play a prominent role in movies, video games, and other interactive applications. One particular area where such simulation has become prominent is the modeling and simulated fitting of garments or articles of clothing. Physics based simulation may be applied to modeling of complex cloth dynamics and motion, and can provide a realistic and natural simulation result.

At least some known cloth simulations involve modeling the cloth material properties by solving implicit or semi-implicit integration, and performing complicated collision handling and response. However, these methods can be computationally expensive. In addition, when simulating an interactive virtual garment fitting, such methods may not be able to meet the requirements for high visual quality simulation, and/or may not perform adequately to provide an accurate simulation indicating whether the garment will actually fit on a destination body shape. Further, at least some known cloth simulations involve the simulation of garment motion over one or more time intervals. Each simulation may involve a significant time cost, leading to untenable time requirements when simulating a garment fitting, particularly in situations involving multiple garment fittings.

BRIEF DESCRIPTION

The embodiments described herein enable reduction of the time required to simulate the fitting of a deformable object, such as a garment, onto a destination body shape, while also offering high accuracy of the garment fitting. For example, in one embodiment, a method for reducing the time required to simulate the fitting of a garment over one or more time intervals is disclosed. A plurality of source body meshes is generated, wherein each source body mesh corresponds to a useable body shape. At least one of the source body meshes is selected based, at least in part, on body measurements of a destination body mesh, and the selected source body meshes are cached. At least one of the cached source body meshes is selected, based, at least in part, on a wearable measurement range of the garment. For each of the selected cached source body meshes, a deformable object mesh representing the garment is generated, wherein the generating is based, at least in part, on the selected cached source body mesh. A source body mesh having body measurements that most closely match the body measurements of the destination body mesh is identified from among the selected cached source body meshes.

In other embodiments, a system for reducing the time required to simulate the fitting of a garment over one or more time intervals is disclosed. The system comprises a computing device configured to generate a plurality of source body meshes, wherein each source body mesh corresponds to a useable body shape. The computing device may select at least one of the source body meshes based, at least in part, on body measurements of a destination body mesh and cache the selected source body meshes. At least one of the cached source body meshes is selected, based, at least in part, on a wearable measurement range of the garment. For each of the selected cached source body meshes, the computing device may generate a deformable object mesh representing the garment, wherein the generating is based, at least in part, on the selected cached source body mesh. The computing device may identify, from among the selected cached source body meshes, a source body mesh having body measurements that most closely match the body measurements of the destination body mesh.

In yet other embodiments, a non-transitory computer readable medium is disclosed, having instructions stored thereon for reducing the time required to simulate the fitting of a garment over one or more time intervals. The instructions, when executed by a processor, cause a device to perform operations for such simulation. For example, the device may generate a plurality of source body meshes, wherein each source body mesh corresponds to a useable body shape. The device may select at least one of the source body meshes based, at least in part, on body measurements of a destination body mesh and cache the selected source body meshes. The device may select at least one of the cached source body meshes, based, at least in part, on a wearable measurement range of the garment. For each of the selected cached source body meshes, the device may generate a deformable object mesh representing the garment, wherein the generating is based, at least in part, on the selected cached source body mesh. The device may identify, from among the selected cached source body meshes, a source body mesh having body measurements that most closely match the body measurements of the destination body mesh.

II. DETAILED DESCRIPTION

As described above, at least some known cloth simulation methods can be computationally expensive and may not be able to provide high visual quality simulation within a reasonable period of time. The embodiments described herein enable the reduction of the time required to simulate a garment fitting onto a destination body shape with high visual quality, while also offering high performance and accuracy. The embodiments described herein include, for example, caching of source body meshes having a geometric difference with a destination body mesh that is within a predefined threshold. At least one of the cached source body meshes is selected, based, at least in part, on a wearable measurement range of the garment. For each of the selected cached source body meshes, a deformable object mesh representing the garment is generated, wherein the generating is based, at least in part, on the selected cached source body mesh. A source body mesh having body measurements that most closely match the body measurements of the destination body mesh is identified from among the selected cached source body meshes.

Figure 1:
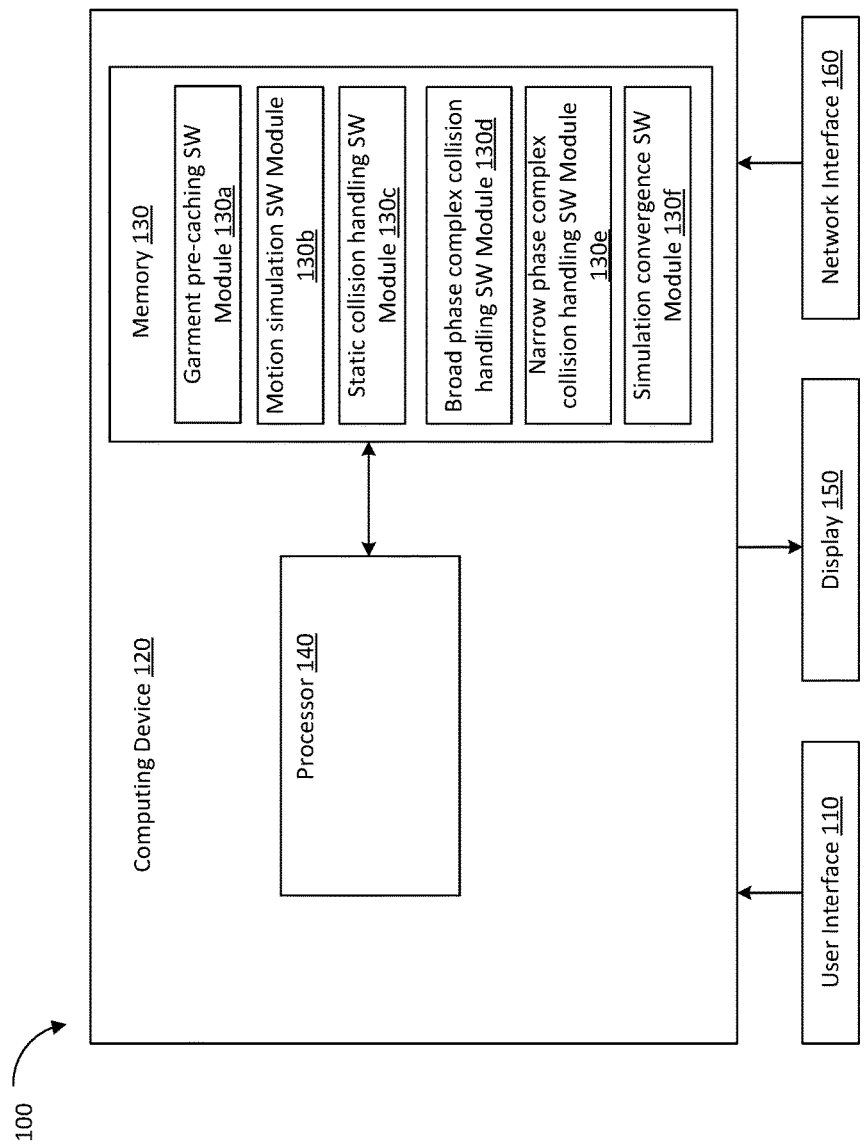
FIG. 1 is a block diagram of an exemplary system for simulating the fitting of a garment in accordance with some embodiments of the present disclosure.

FIG. 1 illustrates a functional block diagram of an example system 100 for simulating the fitting of a garment to a destination body shape. System 100 may include a user interface 110, a computing device 120, a display 150, and a network interface 160. Computing device 120 may include a memory 130, and a processor 140. In some examples, user interface 110, computing device 120, display 150, and network interface 160 may be embodied on a single device. In other examples, user interface 110, computing device 120, display 150, and network interface 160 may refer to two or more devices distributed over several physical locations, connected by one or more wired and/or wireless links.

System 100 may be configured to perform a garment simulation as discussed herein and also detailed in U.S. patent application Ser. No. 15/806,256 entitled PHYSICS BASED GARMENT SIMULATION SYSTEMS AND METHODS filed on Nov. 7, 2017, which is incorporated herein by reference in its entirety.

User interface 110 may represent any electronic device or application on an electronic device configured to receive user input corresponding to one or more 3D polygonal meshes representing the shape of a deformable object, such as a garment (hereinafter "garment mesh"), one or more 3D polygonal meshes representing the shape of one or more kinematic objects, such as one or more bodies of various shapes (hereinafter "body mesh"), and one or more 3D polygonal meshes representing one or more environmental objects, such as a floor (hereinafter "environmental object mesh"). In addition, body meshes may be of two types: source body meshes representing a body shape and the corresponding body measurements of the body on which a garment mesh was previously fitted, and destination body meshes representing a body shape on which the garment mesh is to be fitted. A destination body mesh may be based on the body measurements of the body a garment is to be fitted on. The invention will be described in terms of five dimensional (5D) body measurements, however this is not a limitation and any suitable number of measurement dimensions may be used. The 5D measurements may include, for example, body height, breast size, under-breast size, waist size, and hip size respectively. For purposes of the present disclosure, a garment mesh may be understood to mean a 3D representation of a garment based, at least in part, on its 5D measurements. When initializing a simulation, the garment mesh to be simulated may be input to the simulation as a 3D polygonal mesh fitted to a source body mesh (also a 3D polygonal mesh). Sources of garment and body meshes may include any suitable source for capturing images, scanning materials, or any software that can be used to create the mesh. Sources may include, without being limited to, cameras, video recorders, 3D scanners, and digital rendering/ authoring tools for 3D illustration. In addition, one or more types of meshes may be pre-stored (cached) in memory 130 prior to any simulation as discussed in more detail below and accessed via the user interface 110.

Figure 2A:
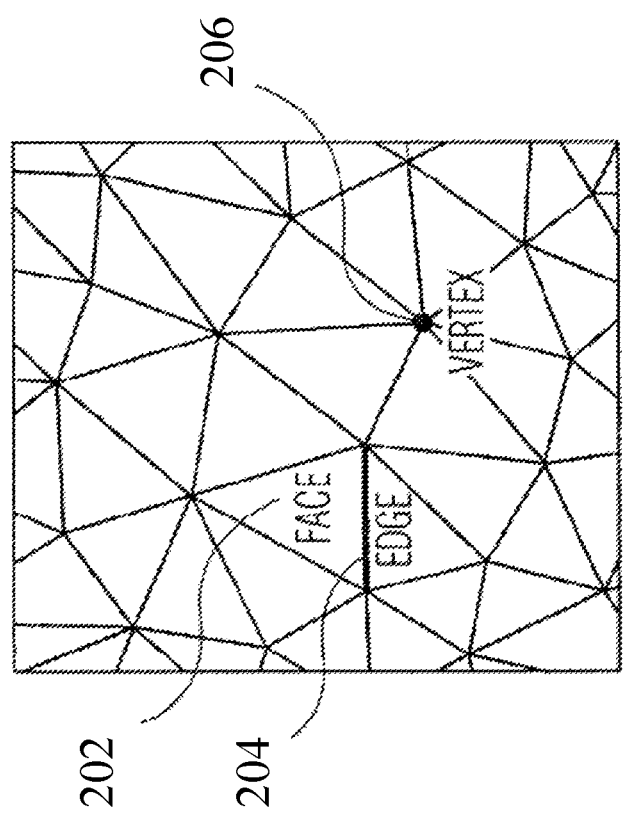
FIG. 2A is a zoomed in view of an exemplary three dimensional (3D) mesh representation of a garment in accordance with some embodiments of the present disclosure.
Figure 2B:
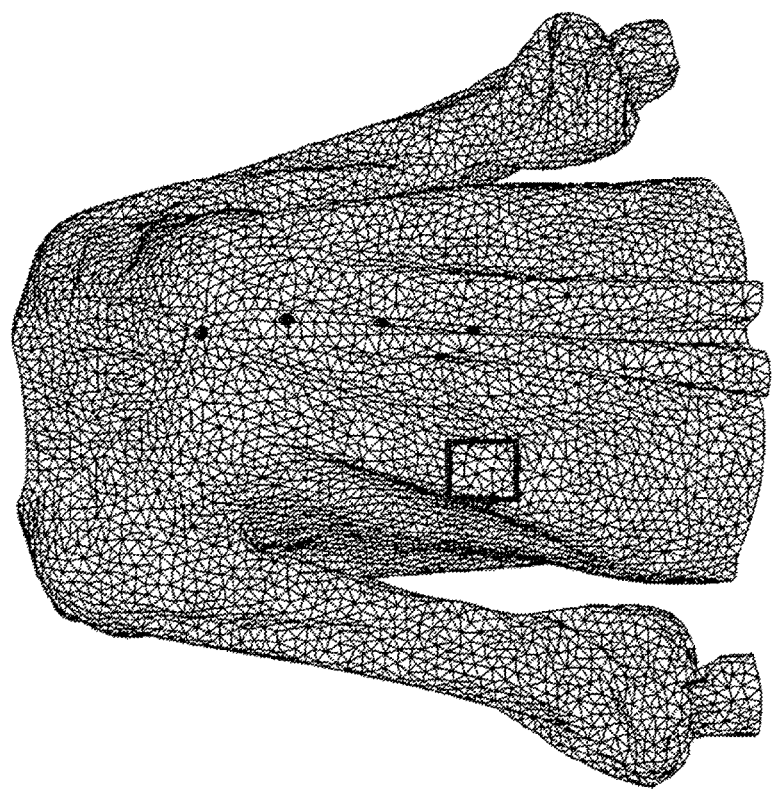
FIG. 2B is a perspective view of an exemplary 3D mesh representation of a garment in accordance with some embodiments of the present disclosure.
Figure 2C:
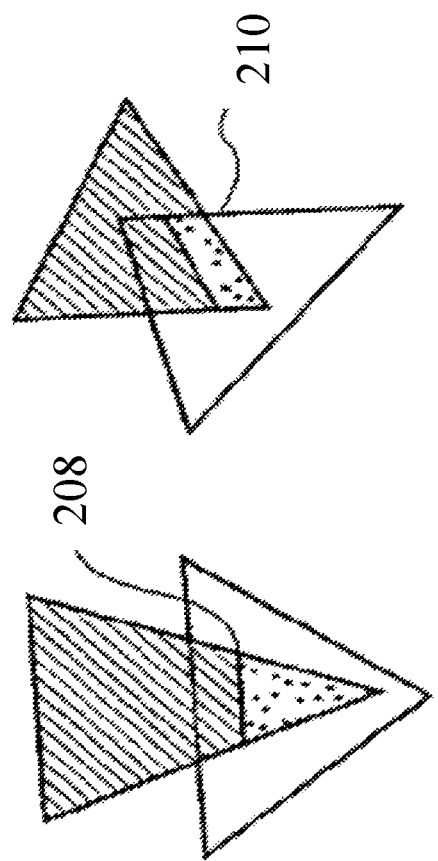
FIG. 2C is a perspective view of an exemplary collision between two faces from one or more 3D mesh representations in accordance with some embodiments of the present disclosure.

FIGS. 2A, 2B, and 2C illustrate various aspects of three-dimensional polygonal meshes which may be useful for understanding the description herein. Inputs to system 100 (shown in FIG. 1) may include one or more garment meshes, one or more body meshes, and one or more environmental meshes. As shown in FIG. 2A, a polygonal mesh refers to a collection of vertices 206, edges 204, and faces 202 that together approximate a three dimensional shape (e.g., the garment mesh as shown in FIG. 2B is in a geometric shape as if it is worn on a body). The shape may be induced from, for example, a prior cloth simulation, a 3D scan from real-world sources, created by 3D artists, or by any related methods. Similarly, the shape of a body mesh may be determined from a 3D scan of a physical body or may be directly created by 3D artists. The scanned body may be a real human body or an artificial mannequin. During a garment fitting simulation, the motion of garment meshes may be predicted based on the material properties of the garment as well as one or more external parameters. In addition, the motion of a body mesh on which the garment mesh is to be fitted may be simulated by interpolating between a source and destination body mesh, as discussed in further detail below. Thus, during such a simulation, the garment meshes, body meshes, and environmental object meshes may collide with each other or with themselves based, at least in part, on the predicted motion of the garment and body meshes.

An exemplary collision is illustrated in FIG. 2C, wherein if two faces intersect, then either two edges of one face intersect the other face (as shown in 208) or one edge of each face intersects the other (as shown in 210). In general, the meshes may be manifold polygonal triangle meshes represented in files of any suitable format, such as a standard data format (for example, Wavefront obj from Wavefront Technologies, a division of Autodesk). For example, a garment mesh file may include associated information regarding the material properties of the garment, such as texture and material information, stretching, bending, structure, and thickness among other information. A garment mesh file may also include garment information such as, without being limited to, one or more of a garment identifier, manufacturer, designer, store information, material information, rendering options, 5D measurements, layering order, and date. Non-triangle meshes may be converted into triangle meshes by any known suitable means, and non-manifold meshes may be converted into manifold meshes by any known suitable means. In some examples, when a received mesh is identified as being of poor quality (by a suitable quality metric), it may be remeshed by any known suitable method. In some examples, equipment may be used to capture information data that may be transformed to meshes through software.

Referring back to FIG. 1, computing device 120 may be configured to receive a garment mesh, a source body mesh (i.e., the body mesh to which the garment mesh is currently fitted), a destination body mesh (i.e. the body mesh to which the garment mesh is to be fitted), and at least one environmental object mesh from user interface 110. The embodiments of the present disclosure are described below in terms of triangle meshes, however this is for ease of illustration and a 3D mesh may be comprised of any suitable polygonal shape.

Memory 130 may include a non-transitory computer-readable medium (e.g., one or more nonvolatile memory elements, such as EPROM, EEPROM, Flash memory, a hard drive, and so on) that may store at least the following software (SW) modules:

- a garment pre-caching SW module 130a configured to cache source body and garment meshes having similar 5D measurements as the destination body mesh;
- a motion simulation SW module 130b that is configured to simulate the motion of a garment mesh based on at least one material property of the garment mesh and at least one external parameter, while also performing a linear interpolation between the source body mesh and the destination body mesh, thereby generating an intermediate body mesh at each time interval of the simulation;
  - a static collision handling SW module 130c that is configured to detect collisions between the garment mesh and at least one environmental mesh;
  - a broad phase collision handling SW module 130d that is configured to identify at least one triangle from the garment mesh and at least one triangle from the intermediate body mesh that are potentially in collision;
  - a narrow phase collision handling SW module 130e that is configured to detect and resolve at least one potential collision between the garment mesh and itself and/or at least one potential collision between the garment mesh and the intermediate body mesh. The narrow phase collision handling SW module 130e may also detect and resolve at least one actual collision between the garment mesh and itself and/or at least one actual collision between the garment mesh and the intermediate body mesh; and
  - a simulation convergence SW module 130f that is configured to determine whether the garment fitting simulation has come to a rest state.

In some embodiments, as discussed above, computing device 120 may receive from user interface 110, a garment mesh, a destination body mesh, a source body mesh, and one or more environmental object meshes. For example, a user may import one or more of these meshes from an external device (not shown) such as a camera, video recorder, or 3D scanner via the user interface 110. Alternatively, or in addition to, the user may define one or more of these meshes using digital authoring tools for 3D illustration (not shown), store them (not shown) in memory 130, and provide access to the defined meshes to the processor 140 via user interface 110. Still further, the user may download one or more of these meshes from the internet to memory 130 via the network interface 160 and provide access to the downloaded meshes for use with the garment fitting simulation via user interface 110.

However, garment fitting simulations may simulate the motion of a garment mesh and the source-body mesh interpolation over one or more time intervals until the simulation comes to rest. The simulation may be determined as having come to rest when the velocity of the garment mesh has slowed down to a point that it is negligible as well as when the source body mesh has been interpolated into the destination body mesh. Thus, the smaller the geometric difference is between the source and destination body meshes, the fewer the number of time intervals needed for the simulation to reach a rest state. By pre-caching source body meshes and garment meshes that are within a threshold geometric range of a destination body mesh, the number of time intervals needed to complete a garment fitting simulation may be effectively reduced.

Therefore, in other embodiments, processor 140 may receive only environmental object meshes and a destination body mesh (via e.g., user interface 110) and execute the garment caching SW module 130a in order to pre-cache source body meshes and/or garment meshes having a relatively small geometric difference with the destination body mesh. More specifically, processor 140 may generate a source body mesh for every measurement within a pre-defined range of maximal and minimal 5D measurements. Processor 140 may select each pre-generated source body mesh having 5D measurements that are within a pre-defined threshold geometric difference of the 5D measurements of the destination body mesh. Processor 140 may cache the selected source body meshes in memory 130, for use in future simulations. Processor 140 may also generate a k-dimensional (KD) tree of the cached source body meshes based, at least in part, on the 5D measurements of the cached source body meshes.

In some embodiments, processor 140 may determine the wearable 5D measurement range for a garment the user wishes to perform a fitting for, and remove from the cached source body meshes, those meshes having one or more measurements among their 5D measurements that are outside of the garment's wearable 5D measurement range. The wearable 5D measurement range may refer to the maximum/minimum 5D measurements a garment can be fitted on. Processor 140 may also order the remaining source body meshes based, at least in part, on their 5D measurements. In this way, the processor 140 may make all of the garment-cache results as consistent as possible. Because every body mesh in the ordered list has the smallest difference in their 5D measurements between adjacent body meshes in the list, processor 140 may obtain consistent garment-cache results when simulating from a previous body mesh. In addition, the performance of the pre-caching garment simulation may be greatly increased since fewer time intervals are needed to transform a previously cached body mesh to the destination body mesh such that the next garment-cache simulation can quickly come to a rest state.

Processor 140 may generate one or more garment meshes, with each of the one or more garment meshes in the set corresponding to one of the remaining cached body meshes. Processor 140 may store the set of garment meshes in memory 130. Each garment mesh may be stored as a binary format file that includes the current vertex position and the 5D measurement information of the garment mesh. In this manner, the file size of the garment meshes may be reduced, and the access speed of the garment meshes may be increased during simulation.

Processor 140 may perform a range search, or a nearest neighbor search as is known in the art, of the KD tree in order to identify the cached source body mesh with 5D measurements that are a closest match to the 5D measurements of the destination body mesh. In some embodiments, processor 140 may identify a pre-loaded body mesh having 5D body measurements that are within a pre-defined difference threshold of the destination body mesh's 5D measurements. Processor 140 may select for use in simulation, the identified cached body mesh as well as the garment mesh corresponding to the identified pre-loaded body mesh.

In some embodiments, processor 140 may execute each of SW modules 130b-130f at each time interval over one or more time intervals in order to simulate the fitting of the garment mesh to the destination body mesh until the simulation has come to a rest state (as described below). Processor 140 may execute motion simulation SW module 130b in order to simulate the motion of the garment and body meshes over one or more time intervals. Processor 140 may simulate the motion of the garment mesh based on the material properties of the garment mesh and at least one external parameter. Simultaneously, processor 140 may perform a linear interpolation between the source and destination body meshes over the one or more time intervals, thereby generating an intermediate body mesh at each time interval of the simulation. Stated differently, the motion of the intermediate body mesh may correspond to the position of the source body mesh at each individual time interval as it transitions into the destination body mesh that the garment mesh is to be fitted on.

In some embodiments, processor 140 may utilize a fast semi-integrator algorithm to predict the unconstrained motion of the garment mesh based on the material properties of the garment mesh and external parameters. Processor 140 may integrate at least one external parameter to determine the velocity and position of each vertex of the garment mesh. Examples of external parameters may include gravity, air resistance, friction, damping, and collision response. As discussed above, processor 140 performs a linear interpolation between the source and destination body meshes in order to simulate the motion of the intermediate body mesh. The linear interpolation process relies on a predefined offset value which determines the maximal movement of a vertex in a time step. Stated differently, any one vertex of a body mesh cannot be moved over the maximal value in a time step. Based on this predefined value, processor 140 may compute the required time steps to transform the source body mesh to the destination body mesh under a given time-step size. In order to smooth the intermediate body mesh animation process, processor 140 may choose the vertex in a body mesh which has the maximal Euclidean distance between its source position and destination position to calculate the amount of time steps required for intermediate body mesh transformation or animation such as follows:

Assume $Dist_{MaximalOffset}=0.1$, and
$Dist_{Maximal}Euclidean=V_{source}-V_{destination}|=5.0$.

Then the amount of time step=(Maximal Euclidean Dist/ $Dist_{MaximalOffset}$) (5.0/0.1)=50. Eventually, for an intermediate body mesh in the 10th time interval, processor 140 may determine the vertex position as $V_{intermediate}=V_{source}+(V_{destination}-V_{source})*10/50$.

Figure 3A:
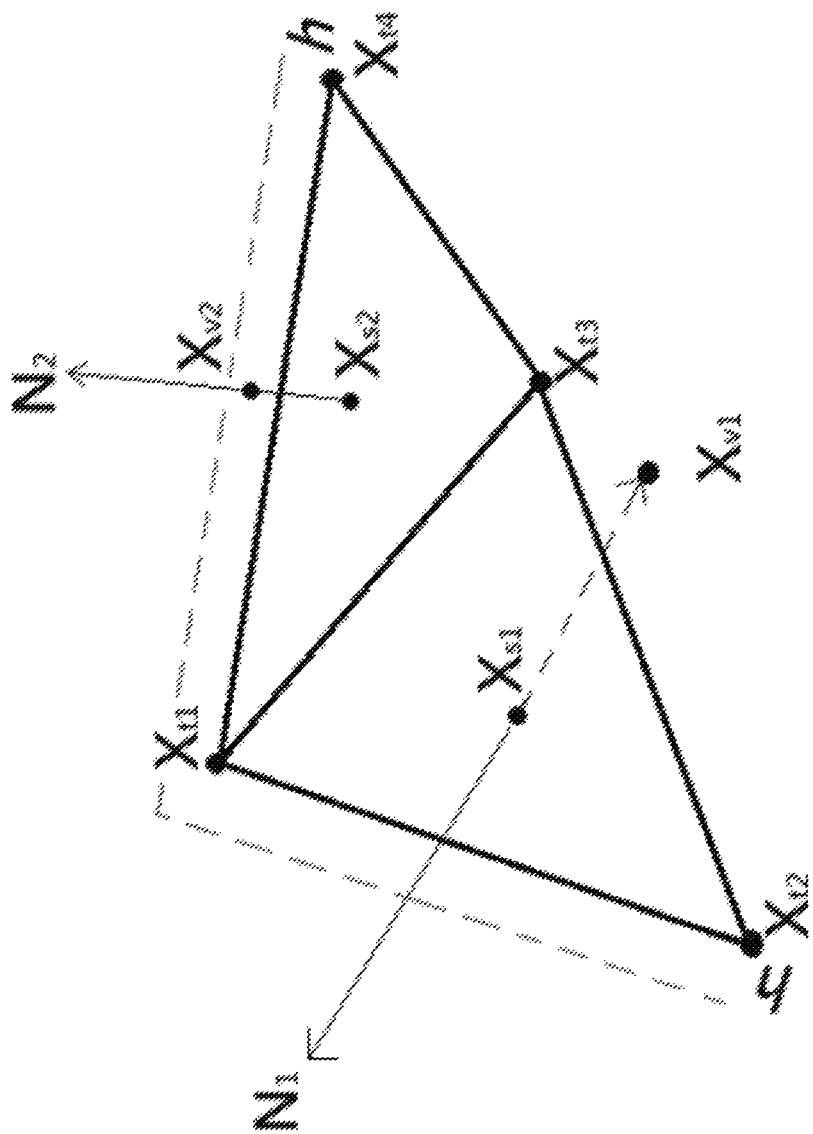
FIG. 3A is a perspective view of an exemplary collision between triangles of different objects in accordance with some embodiments of the present disclosure.

In some embodiments, processor 140 may execute the static collision handling SW module 130c in order to detect and resolve at least one collision between the garment mesh and at least one environmental object mesh. For example, processor 140 may detect each instance when a vertex or edge of the garment mesh is located in the minus-normal direction of the closest triangle of at least one environmental object mesh and/or each instance when a vertex or edge of the garment mesh is within a threshold proximity of the closest triangle of at least one environmental object mesh. FIG. 3A illustrates both scenarios of collision between a vertex of a garment mesh, and one or more triangles of an environmental object mesh. As illustrated in FIG. 3A, H is the threshold proximity (represented here as the height above the face of the triangles), Xv1 and Xv2 are a vertices of the garment mesh (not shown), Xs1 is the point on the triangle face (for the triangle made up of Xt1, Xt2, and Xt3) that is closest to the vertex Xv1, and N1 may be referred to as the triangle normal vector (representing the direction of the collision). Xs2 is the point on the triangle face (for the triangle made up of Xt3, Xt4, and Xt5) that is closest to the vertex Xv2, and N2 may be referred to as the triangle normal vector (representing the direction of the collision). As can be seen, vertex Xv1 lies in the minus normal direction (i.e. vertex Xv1 has pierced the face of the triangle made up of Xt1, Xt2, and Xt3) and is therefore in collision with the triangle. In addition, Xv2 is within the threshold proximity H of the triangle made up of Xt3, Xt4, and Xt5, and is therefore also in collision. For each detected collision, processor 140 may project the garment mesh vertex involved in the collision by a correction offset along the plus-normal direction until the vertex is no longer in collision (i.e. is outside the threshold proximity) with the triangle. Processor 140 may determine the correction offset as:

$$\Delta x_v = h - (x_v - x_s) \cdot n_s = h - (x_v - x_s) \cdot \frac{(x_{t3} - x_{t1}) \times (x_{t2} - x_{t1})}{|(x_{t3} - x_{t1}) \times (x_{t2} - x_{t1})|}$$

Referring back to FIG. 1, in an embodiment, processor 140 may utilize a Gauss-Seidel constraint solver algorithm in order to determine the correction offset for the vertex as well as the direction of the collision. Upon determining the appropriate correction offset for the at least one collision between the garment mesh and the at least one environmental object mesh, processor 140 may project the vertex of the garment mesh involved in the at least one collision by its calculated correction offset along the plus-normal direction (as calculated by processor 140).

In this manner, processor 140 may iteratively resolve each detected collision between the garment mesh and the at least one environmental object mesh. In another embodiment, the processor 140 may accelerate the constraint solving process by using a parallelized constraint solving algorithm. Processor 140 may partition each detected collision into groups based on the proximity of the garment mesh vertex and the environmental object mesh triangle involved in each collision and resolve every single collision in a group independently in parallel. In some embodiments, processor 140 may average the correction offsets of a group, and modify each calculated correction offset for that group based on the averaged offset.

In some embodiments, processor 140 may execute the broad phase complex collision handling SW module 130d in order to identify triangles from the intermediate body mesh and the garment mesh that are not potentially in collision and disregard them for the purposes of collision detection. By removing from consideration those triangles that are not potentially in collision, processor 140 may avoid performing unnecessary computationally expensive collision resolution operations associated with collisions between the garment mesh and the intermediate body mesh, the garment mesh and other garment meshes (if any), and/or between the garment mesh and itself. For example, processor 140 may identify triangles of the garment mesh that are at or beyond a predefined potential collision proximity from any other triangle of the garment mesh and/or the intermediate body mesh. In an embodiment, processor 140 may utilize a bounding volume hierarchy (BVH) tree, as is known in the art, in order to identify and eliminate triangles that are not potentially in collision. For example, processor 140 may utilize a two level BVH tree based on the topology of the garment mesh and the intermediate mesh and may select as a bounding volume, any simple shape such as a sphere, axis aligned bounding box (AABB), capsule, or k-DOP, among others. In an embodiment, processor 140 may take into account certain internal factors such as the thickness of the garment in selecting a bounding volume. In the upper level, processor 140 may construct a bounding volume (sub-node) for each object in the simulation. For every two neighboring sub-nodes, processor 140 may recursively build a parent node and a corresponding bounding volume that is big enough to contain both its direct child nodes. Processor 140 may continue in this fashion until a root node covering all of the nodes is generated. For the lower level, processor 140 may use a "top down" approach and construct a bounding volume to encompass every triangle in an object and divide the object into a set of sub-meshes to build internal nodes. Once the BVH tree is established, processor 140 may identify triangle pairs having triangles that are beyond the potential collision threshold proximity as well as triangle pairs having triangles that are within the potential collision threshold proximity of each other. More specifically, processor 140 may traverse down the two-level BVH tree to perform bounding-volume overlap tests between sub nodes. If both sub-nodes are overlapping, we further pair their child nodes to do next overlap test until the leaf nodes are reached and paired to generate overlapping triangle pairs. Further details regarding bounding volume trees may be found in "MCCD: Multi-core collision detection between deformable models using front-based decomposition" by TANG, M., MANOCHA, D., AND TONG, R. 2010 Graphical Models 72, 2, 7-23, which is incorporated by reference herein. By identifying and eliminating triangle pairs that are not potentially in collision, processor 140 may conserve computing and simulation resources of computing device 120.

In some embodiments, processor 140 may execute narrow phase complex collision handling SW module 130e in order to resolve potential and actual collisions between the garment mesh and the intermediate body mesh, the garment mesh and other garment meshes (if any), and/or between the garment mesh and itself. For each triangle pair that are within the potential collision proximity threshold of each other, processor 140 may determine which of those pairs include triangles that are approaching each other and identify such pairs as potential collisions. In an embodiment, processor 140 may determine triangle pairs that are potential collisions by querying the BVH tree as discussed above. Processor 140 may determine which pairs include triangles that are approaching each other based on the relative velocity in the normal direction of each triangle in the pair. Processor 140 may apply an inelastic repulsive force to each triangle pair identified as a potential collision. Processor 140 may utilize any appropriate algorithm in order to perform the proximity detection and determine appropriate repulsive forces for each triangle pair that is a potential collision. For example, in an embodiment, processor 140 may utilize the Bridson proximity checking algorithm proposed by Robert Bridson, and detailed in "Robust Treatment of Collisions, Contact and Friction for Cloth Animation," The Association for Computing Machinery Inc., 2002, which is incorporated herein by reference. In this way, processor 140 may further decrease the number of subsequent processor intensive actual collision handling processes that must be carried out.

Figure 3B:
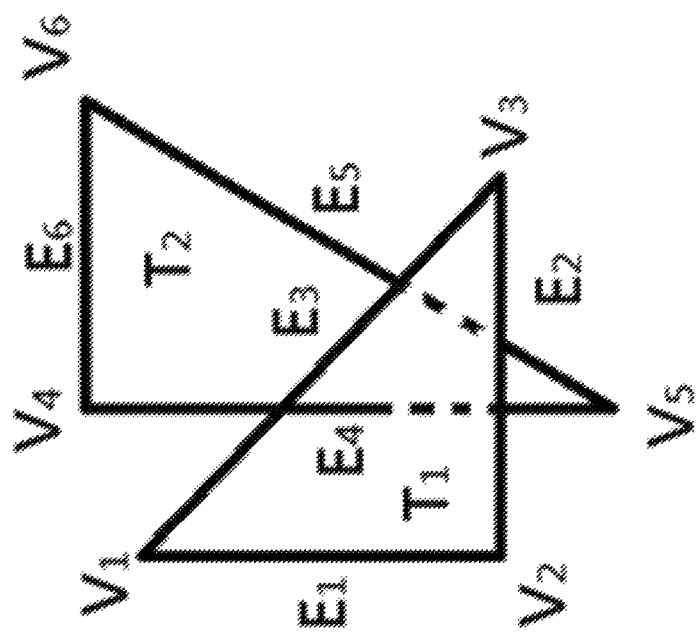
FIG. 3B is a perspective view of different potential collision pairs between triangles of different objects in accordance with some embodiments of the present disclosure.

In some embodiments, processor 140 may detect at least one actual collision between the garment mesh and the intermediate body mesh, the garment mesh and other garment meshes (if any), and/or between the garment mesh and itself. More specifically, processor 140 may detect each instance when a vertex or edge of the garment mesh is located in the minus-normal direction of the closest triangle of the intermediate body mesh or the garment mesh itself, and/or each instance when a vertex or edge of the garment mesh is within the threshold proximity of the closest triangle of the intermediate body mesh or the garment mesh itself. In other words, referring to FIG. 3B, processor 140 may divide each potential triangle-triangle collision pair into 6 vertex-triangle pairs (V1-T2, V2-T2, V3-T3, V4-T1, V5-T1, and V6-T1) and 9 edge-edge collision pairs (E1-E4, E1-E5, E1-E6, E2-E4, E2-E5, E2-E6, E3-E4, E3-E5, and E3-E6) respectively. Processor 140 may determine whether any of these 15 pairs are colliding with each other. Referring back to FIG. 1, processor 140 may utilize an accurate fail-safe collision detection algorithm to determine the contact time and the contact normal (contact direction) for the vertex-triangle or edge-edge pair (hereinafter the "collision pair") involved in the at least one actual collision. Fail-safe collision detection refers to the correct detection of all actual collisions with minimal computation, and processor 140 may utilize any suitable algorithm for performing such fail-safe collision detection. For example, processor 140 may utilize the continuous collision detection (CCD) proposed by Suejung Huh and detailed in Dreamworks Animation Technical Report 2014-320 entitled "Fast and Robust Continuous Collision Detection," which is incorporated herein by reference. Based on the contact time and contact normal of the at least one actual collision, processor 140 computes a restitution impulse and a direction thereof, and applies the computed restitution impulse to the collision pair involved in the at least one actual collision.

The use of CCD may not eliminate all of the detected actual collisions, and therefore execution of the narrow phase complex collision handling SW module 130e also causes processor 140 to perform an additional step of impact zone resolution, to resolve any remaining actual collisions between the garment mesh and the intermediate body mesh, the garment mesh and other garment meshes (if any), and/or between the garment mesh and itself. Processor 140 may treat all remaining collision pairs simultaneously and iteratively solve a set of inelastic projections on the vertex velocity to push the collision pair apart, while also preventing the collision pair from approaching further. Processor 140 may use any suitable algorithm, such as the Harmon impact zone resolution algorithm, proposed by Robert Harmon et al. and detailed in "Robust Treatment of Simultaneous Collisions," which is incorporated herein by reference. The impact zone approach serves to solve any remaining actual collisions while preserving as much tangential motion as possible.

In some embodiments, processor 140 may execute the simulation convergence SW module 130f to determine if the simulation has come to a rest state and if the source body mesh has been fully interpolated into the destination body mesh. The rest state occurs when the motion of the garment mesh has slowed down to a level that such motion can be ignored visually. Processor 140 determines whether the velocity of the garment mesh is below a predefined velocity threshold and whether the garment mesh's duration time exceeds a heuristic time such that the simulation's convergence is not affected. Each vertex of the garment mesh may have its own velocity, thus processor 140 may assume the velocity of the garment mesh to be the average velocity among all of its vertices when determining if the garment mesh's velocity is below the predefined velocity threshold. Processor 140 may maintain two kinds of vertex position buffers to represent the vertex positions of a mesh at the beginning of a time-step and the end of a time-step respectively. Processor 140 may replicate the position buffer of both garment and body meshes at the end of a time step to the position buffer at the beginning of a time step, while the simulation has not reached the rest state and needs to perform the next time-step's simulation. Processor 140 may utilize the beginning position buffer to check potential collision pairs and compute the contact time and normal using CCD, for example.

If processor 140 determines that the velocity of the garment mesh is not below the predefined velocity threshold, then processor 140 may advance the simulation to the next time interval and continue simulating the motion of the garment and intermediate body meshes based on each object's vertex positions and each object's velocity at the end of the previous simulation interval. Similarly, if processor 140 determines that the source body mesh is not fully interpolated, then processor 140 may advance the simulation to the next time interval and continue simulating the motion of the garment and intermediate body meshes based on each object's vertex positions and each object's velocity at the end of the previous simulation interval.

If, however, processor 140 does determine that the velocity of the garment mesh is below the predefined velocity threshold, and that the source body mesh is fully interpolated, then it may end the simulation and display the result of the fitting to a user via display 150.

As discussed above, the amount of time required to reach convergence is based, at least in part, on the difference between the source and destination body meshes. The smaller the amount of geometric difference between the source and destination body meshes, the faster the simulation may reach convergence (i.e. come to the rest state). Thus, use of pre-cached source body and garment meshes may reduce the time required to simulate the fitting of the garment.

Figure 4A:
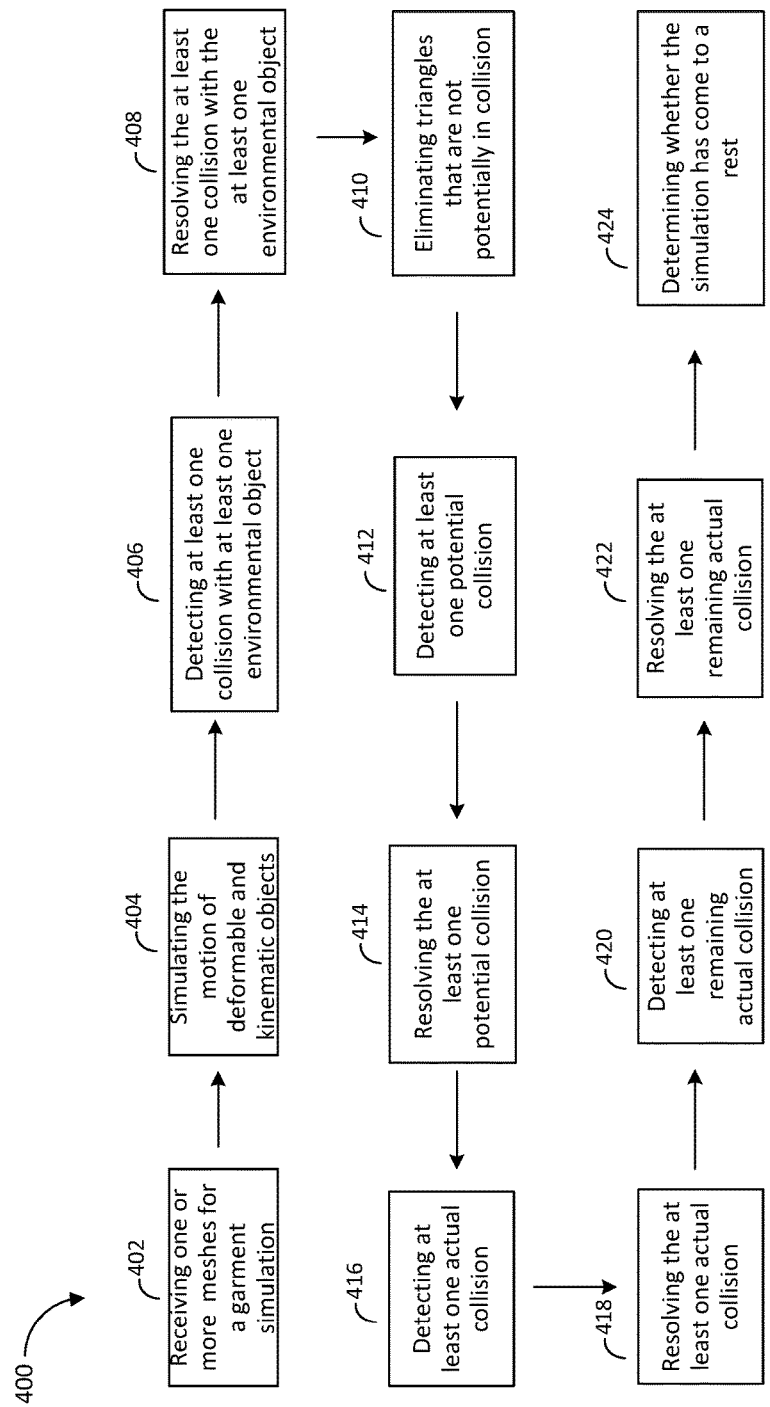
FIG. 4A is a flow diagram of an exemplary method for simulating the fitting of a garment using the system shown in FIG. 1, in accordance with some embodiments of the present disclosure.

FIG. 4 is a flow diagram 400 of an exemplary method for simulating a garment fitting, using system 100 (shown in FIG. 1).

At 402, in some embodiments, computing device 120 may receive from user interface 110, a garment mesh, a destination body mesh, a source body mesh, and one or more environmental object meshes. For example, a user may import one or more of these meshes from an external device (not shown) such as a camera, video recorder, or 3D scanner via the user interface 110. Alternatively, or in addition to, the user may define one or more of these meshes using digital authoring tools for 3D illustration (not shown), store them (not shown) in memory 130, and provide access to the defined meshes to the processor 140 via user interface 110. Still further, the user may download one or more of these meshes from the internet to memory 130 via the network interface 160 and provide access to the downloaded meshes for use with the garment fitting simulation via user interface 110.

However, garment fitting simulations may simulate the motion of a garment mesh and the source-body mesh interpolation over one or more time intervals until the simulation comes to rest. The simulation may be determined as having come to rest when the velocity of the garment mesh has slowed down to a point that it is negligible as well as when the source body mesh has been interpolated into the destination body mesh. Thus, the smaller the geometric difference is between the source and destination body meshes, the fewer the number of time intervals needed for the simulation to reach a rest state. By pre-caching source body meshes and garment meshes that are within a threshold geometric range of a destination body mesh, the number of time intervals needed to complete a garment fitting simulation may be effectively reduced.

Figure 4B:
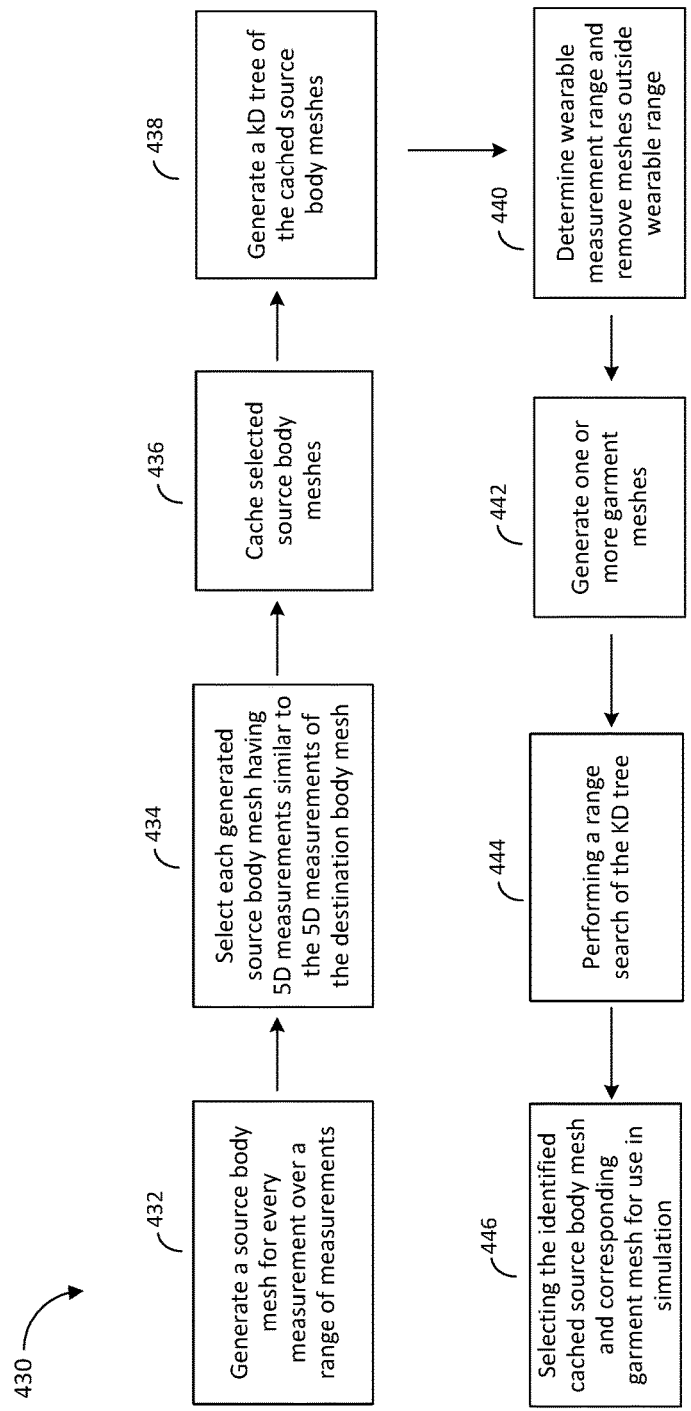
FIG. 4B is a flow diagram of an exemplary method for reducing the time required to simulate the fitting of a garment, in accordance with some embodiments of the present disclosure.

Therefore, in other embodiments, processor 140 may receive only environmental object meshes and a destination body mesh (via e.g., user interface 110) and execute the garment caching SW module 130*a* in order to pre-cache source body meshes and/or garment meshes having a relatively small geometric difference with the destination body mesh. FIG. 4B illustrates a method 430 for reducing the time required to perform a garment fitting simulation in accordance with some embodiments. More specifically, at 432, processor 140 may generate a source body mesh for every measurement within a pre-defined range of maximal and minimal 5D measurements. At 434, processor 140 may select each pre-generated source body mesh having 5D measurements that are within a pre-defined threshold geometric difference of the 5D measurements of the destination body mesh. At 436, processor 140 may cache the selected source body meshes in memory 130, for use in future simulations. At 438, processor 140 may also generate a k-dimensional (KD) tree of the cached source body meshes based, at least in part, on the 5D measurements of the cached source body meshes.

At 440, processor 140 may determine the wearable 5D measurement range for a garment the user wishes to perform a fitting for, and remove from the cached source body meshes, those meshes having one or more measurements among their 5D measurements that are outside of the garment's wearable 5D measurement range. The wearable 5D measurement range may refer to the maximum/minimum 5D measurements a garment can be fitted on. Processor 140 may also order the remaining source body meshes based, at least in part, on their 5D measurements. In this way, the processor 140 may make all of the garment-cache results as consistent as possible. Because every body mesh in the ordered list has the smallest difference in their 5D measurements between adjacent body meshes in the list, processor 140 may obtain consistent garment-cache results when simulating from a previous body mesh. In addition, the performance of the pre-caching garment simulation may be greatly increased since fewer time intervals are needed to transform a previously cached body mesh to the destination body mesh such that the next garment-cache simulation can quickly come to a rest state.

At 442, processor 140 may generate one or more garment meshes, with each of the one or more garment meshes in the set corresponding to one of the remaining cached source body meshes. Processor 140 may store the one or more garment meshes in memory 130. Each garment mesh may be stored as a binary format file that includes the current vertex position and the 5D measurement information of the garment mesh. In this manner, the file size of the garment meshes may be reduced, and the access speed of the garment meshes may be increased during simulation.

At 444, processor 140 may perform a range search, or a nearest neighbor search as is known in the art, of the KD tree in order to identify the pre-loaded body mesh with 5D measurements that are a closest match to the 5D measurements of the destination body mesh. In some embodiments, processor 140 may identify a pre-loaded body mesh having 5D body measurements that are within a pre-defined difference threshold of the destination body mesh's 5D measurements. At 446, processor 140 may select for use in simulation, the identified pre-loaded body mesh as well as the garment mesh corresponding to the identified pre-loaded body mesh.

Referring back to FIG. 4A, at 404, upon receiving the meshes (or access thereto) as described above, processor 140 may simulate the motion of the garment and body meshes over one or more time intervals until the simulation has come to rest (as discussed below). Processor 140 may simulate the motion of the garment mesh based on the material properties of the garment mesh and at least one external parameter. Simultaneously, processor 140 may perform a linear interpolation between the source and destination body meshes over the one or more time intervals, thereby generating an intermediate body mesh at each time interval of the simulation. Stated differently, the motion of the intermediate body mesh may correspond to the position of the source body mesh at each individual time interval as it transitions into the destination body mesh that the garment mesh is to be fitted on.

Processor 140 may utilize a fast semi-integrator algorithm to predict the unconstrained motion of the garment mesh based on the material properties of the garment mesh and external parameters. Processor 140 may integrate at least one external parameter to determine the velocity and position of each vertex of the garment mesh. Examples of external parameters may include gravity, air resistance, friction, damping, and collision response. As discussed above, processor 140 performs a linear interpolation between the source and destination body meshes in order to simulate the motion of the intermediate body mesh. The linear interpolation process relies on a predefined offset value which determines the maximal movement of a vertex in a time step. Stated differently, any one vertex of a body mesh cannot be moved over the maximal value in a time step. Based on this predefined value, processor 140 may compute the required time steps to transform the source body mesh to the destination body mesh under a given time-step size. In order to smooth the intermediate body mesh animation process, processor 140 may choose the vertex in a body mesh which has the maximal Euclidean distance between its source position and destination position to calculate the amount of time steps required for intermediate body mesh transformation or animation such as follows:

Assume $Dist_{MaximalOffset}=0.1$, and $|Dist_{Maximal Euclidean}=V_{source}-V_{destination}|=5.0$.

Then the amount of time step=(Maximal Euclidean Dist/$Dist_{MaximalOffset}$)=(5.0/0.1)=50. Eventually, for an intermediate body mesh in the 10th time interval, the vertex position will be determined as $V_{intermediate}=V_{source}+(V_{destination}-V_{source})*10/50$.

At 406, processor 140 may detect at least one collision between the garment mesh and at least one environmental object mesh. More specifically, processor 140 may detect each instance when a vertex or edge of the garment mesh is located in the minus-normal direction of the closest triangle of at least one environmental object mesh and/or each instance when a vertex or edge of the garment mesh is within a threshold proximity of the closest triangle of at least one environmental object mesh. At step 408, for each detected collision, processor 140 may project the garment mesh vertex involved in the collision by a correction offset along the plus-normal direction until the vertex is no longer in collision (i.e. is outside the threshold proximity) with the triangle. Processor 140 may determine the correction offset as described above with respect to FIG. 3A. Upon determining the appropriate correction offset for the at least one collision between the garment mesh and the at least one environmental object mesh, processor 140 may project the vertex of the garment mesh involved in the at least one collision by its calculated correction offset along the plus-normal direction (as calculated by processor 140).

In an embodiment, processor 140 may utilize a Gauss-Seidel constraint solver algorithm in order to determine the correction offset for the vertex as well as the direction of the collision. In this manner, processor 140 may iteratively resolve each detected collision between the garment mesh and the at least one environmental object mesh. In another embodiment, the processor 140 may accelerate the constraint solving process by using a parallelized constraint solving algorithm. Processor 140 may partition each detected collision into groups based on the proximity of the garment mesh vertex and the environmental object mesh triangle involved in each collision and resolve every single collision in a group independently in parallel. In some embodiments, processor 140 may average the correction offsets of a group, and modify the each calculated correction offset for that group with the averaged offset.

At 410, processor 140 may identify triangles from the intermediate body mesh and the garment mesh that are not potentially in collision and disregard them for the purposes of collision detection. By removing from consideration those triangles that are not potentially in collision, processor 140 may avoid performing unnecessary computationally expensive collision resolution operations associated with collisions between the garment mesh and the intermediate body mesh, the garment mesh and other garment meshes (if any), and/or between the garment mesh and itself. For example, processor 140 may utilize a two level BVH tree based on the topology of the garment mesh and the intermediate mesh and may select as a bounding volume, any simple shape such as a sphere, axis aligned bounding box (AABB), capsule, or k-DOP, among others. In an embodiment, processor 140 may take into account certain internal factors such as the thickness of the garment in selecting a bounding volume. In the upper level, processor 140 may construct a bounding volume (sub-node) for each object in the simulation. For every two neighboring sub-nodes, processor 140 may recursively build a parent node and a corresponding bounding volume that is big enough to contain both its direct child nodes. Processor 140 may continue in this fashion until a root node covering all of the nodes is generated. For the lower level, processor 140 may use a "top down" approach and construct a bounding volume to encompass every triangle in an object and divide the object into a set of sub-meshes to build internal nodes. Once the BVH tree is established, processor 140 may identify triangle pairs having triangles that are beyond the potential collision threshold proximity as well as triangle pairs having triangles that are within the potential collision threshold proximity of each other. More specifically, processor 140 may traverse down the two-level BVH tree to perform bounding-volume overlap tests between sub nodes. If both sub-nodes are overlapping, we further pair their child nodes to do next overlap test until the leaf nodes are reached and paired to generate overlapping triangle pairs. Further details regarding bounding volume trees may be found in "MCCD: Multi-core collision detection between deformable models using front-based decomposition" by TANG, M., MANOCHA, D., AND TONG, R. 2010 Graphical Models 72, 2, 7-23, which is incorporated by reference herein. By identifying and eliminating triangle pairs that are not potentially in collision, processor 140 may conserve computing and simulation resources of computing device 120.

At 412, processor 140 may detect at least one potential collision between the garment mesh and the intermediate body mesh, the garment mesh and other garment meshes (if any), and/or between the garment mesh and itself. For each triangle pair having triangles that are within the potential collision proximity threshold of each other, processor 140 may determine which of those pairs include triangles that are approaching each other and identify such pairs as potential collisions. In an embodiment, processor 140 may determine triangle pairs that are potential collisions by querying the BVH tree as discussed above. Processor 140 may determine which pairs include triangles that are approaching each other based on the relative velocity in the normal direction of each triangle in the pair. At step 414, processor 140 may apply an inelastic repulsive force to each triangle pair identified as a potential collision. Processor 140 may utilize any appropriate algorithm in order to perform the proximity detection and determine appropriate repulsive forces for each triangle pair that is a potential collision. For example, in an embodiment, processor 140 may utilize the Bridson proximity checking algorithm proposed by Robert Bridson, and detailed in "Robust Treatment of Collisions, Contact and Friction for Cloth Animation," The Association for Computing Machinery Inc., 2002, which is incorporated herein by reference. In this way, processor 140 may further decrease the number of subsequent processor intensive actual collision handling processes that must be carried out.

At 416, processor 140 may detect at least one actual collision between the garment mesh and the intermediate body mesh, the garment mesh and other garment meshes (if any), and/or between the garment mesh and itself. More specifically, processor 140 may detect each instance when a vertex or edge of the garment mesh is located in the minus-normal direction of the closest triangle of the intermediate body mesh or the garment mesh itself, and/or each instance when a vertex or edge of the garment mesh is within the threshold proximity of the closest triangle of the intermediate body mesh or the garment mesh itself. In other words, referring to FIG. 3B, processor 140 may divide each potential triangle-triangle collision pair into 6 vertex-triangle pairs (V1-T2, V2-T2, V3-T3, V4-T1, V5-T1, and V6-T1) and 9 edge-edge collision pairs (E1-E4, E1-E5, E1-E6, E2-E4, E2-E5, E2-E6, E3-E4, E3-E5, and E3-E6) respectively. Processor 140 may determine whether any of these 15 pairs are colliding with each other. At 418, processor 140 may resolve the at least one actual collision. Referring back to FIG. 1, processor 140 may utilize an accurate fail-safe collision detection algorithm to determine the contact time and the contact normal (contact direction) for the vertex-triangle or edge-edge pair (hereinafter the "collision pair") involved in the at least one actual collision. Fail-safe collision detection refers to the correct detection of all actual collisions with minimal computation, and processor 140 may utilize any suitable algorithm for performing such fail-safe collision detection. For example, processor 140 may utilize the continuous collision detection (CCD) proposed by Suejung Huh and detailed in Dreamworks Animation Technical Report 2014-320 entitled "Fast and Robust Continuous Collision Detection," which is incorporated herein by reference. Based on the contact time and contact normal of the at least one actual collision, processor 140 computes a restitution impulse and a direction thereof, and applies the computed restitution impulse to the collision pair involved in the at least one actual collision.

The use of CCD may not eliminate all of the detected actual collisions, and therefore, at 420, processor 140 may detect at least one remaining actual collision. At 422, processor 140 performs an additional step of impact zone resolution, to resolve any remaining actual collisions between the garment mesh and the intermediate body mesh, the garment mesh and other garment meshes (if any) and/or between the garment mesh and itself. Processor 140 may treat all remaining collision pairs simultaneously and iteratively solve a set of inelastic projections on the vertex velocity to push the collision pair apart, while also preventing the collision pair from approaching further. Processor 140 may use any suitable algorithm, such as the Harmon impact zone resolution algorithm, proposed by Robert Harmon et al. and detailed in "Robust Treatment of Simultaneous Collisions," which is incorporated herein by reference. The impact zone approach serves to solve any remaining actual collisions while preserving as much tangential motion as possible.

At 424, processor 140 determines if the simulation has come to a rest state. The rest state occurs when the motion of the garment mesh has slowed down to a level that such motion can be ignored visually. Processor 140 determines whether the velocity of the garment mesh is below a predefined velocity threshold and whether the garment mesh's duration time exceeds a heuristic time such that the simulation's convergence is not affected. Each vertex of the garment mesh may have its own velocity, thus processor 140 may assume the velocity of the garment mesh to be the average velocity among all of its vertices when determining if the garment mesh's velocity is below the predefined velocity threshold. Processor 140 may maintain two kinds of vertex position buffers to represent the vertex positions of a mesh at the beginning of a time-step and the end of a time-step respectively. Processor 140 may replicate the position buffer of both garment and body meshes at the end of a time step to the position buffer at the beginning of a time step, while the simulation has not reached the rest state and needs to perform the next time-step's simulation. Processor 140 may utilize the beginning position buffer to check potential collision pairs and compute the contact time and normal in CCD, for example.

If processor 140 determines that the velocity of the garment mesh is not below the predefined velocity threshold, then processor 140 may advance the simulation to the next time interval and continue simulating the motion of the garment and intermediate body meshes based on each object's vertex positions and each object's velocity at the end of the previous simulation interval. Similarly, if processor 140 determines that the source body mesh is not fully interpolated, then processor 140 may advance the simulation to the next time interval and continue simulating the motion of the garment and intermediate body meshes based on each object's vertex positions and each object's velocity at the end of the previous simulation interval.

If, however, processor 140 does determine that the velocity of the garment mesh is below the predefined velocity threshold, then it may end the simulation and display the result of the fitting to a user via display 150. Similarly, if processor 140 determines that the source body mesh is fully interpolated, then it may end the simulation and display the result of the fitting to a user via display 150.

The amount of time required to reach convergence is based, at least in part, on the difference between the source and destination body meshes. The smaller the amount of geometric difference between the source and destination body meshes, the faster the simulation may reach convergence (i.e. come to the rest state). Thus, garment and source body meshes that are a close geometric match for a destination body mesh input by a user may be cached prior to simulation, as discussed more fully with respect to FIG. 4B.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. The computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for reducing the time required to simulate the fitting of a garment, the method comprising:
    generating a plurality of source body meshes, wherein each source body mesh in the plurality corresponds to a useable body shape;
    selecting at least one of the plurality of source body meshes based, at least in part, on body measurements of a destination body mesh and caching the selected at least one of the plurality of source body meshes;
    selecting at least one of the cached source body meshes based, at least in part, on a wearable measurement range of the garment and generating, for each of the at least one selected cached source body meshes, a deformable object mesh representing the garment, wherein the generating is based, at least in part, on the selected at least one of the cached source body meshes; and
    identifying, from the selected at least one of the cached source body meshes, a source body mesh having body measurements that are within a threshold difference of the body measurements of the destination body mesh.

2. The method of claim 1, further comprising simulating the fitting of the garment based, at least in part, on the identified source body mesh and its corresponding deformable object mesh.

3. The method of claim 1, further comprising caching each of the generated deformable meshes, wherein each generated deformable mesh is cached as a binary format file including the vertex positions and body measurements of the deformable mesh.

4. The method of claim 1, further comprising building a k dimensional (KD) tree representing the cached at least one source body meshes based, at least in part, on the body measurements of each of the cached at least one source body meshes.

5. The method of claim 4, wherein the identifying comprises using the KD tree to locate the source body mesh among the selected one or more cached source body meshes having body measurements that most closely match the body measurements of the destination body mesh.

6. The method of claim 5, wherein the identifying further comprises performing a range search through the KD tree to locate the source body mesh among the selected one or more cached source body meshes having body measurements that most closely match the body measurements of the destination body mesh.

7. The method of claim 1, further comprising ordering the selected at least one cached source body meshes based on the body measurements of each of the selected at least one cached source body meshes.

8. A non-transitory computer readable medium having instructions stored thereon for reducing the time required to simulate the fitting of a garment, wherein the instructions, when executed by a processor cause a device to perform operations comprising:
    generating a plurality of source body meshes, wherein each source body mesh in the plurality corresponds to a useable body shape;
    selecting at least one of the plurality of source body meshes based, at least in part, on body measurements of a destination body mesh and caching the selected at least one of the plurality of source body meshes;
    selecting at least one of the cached source body meshes based, at least in part, on a wearable measurement range of the garment and generating, for each of the at least one selected cached source body meshes, a deformable object mesh representing the garment, wherein the generating is based, at least in part, on the at least one selected cached source body mesh; and identifying, from among the selected at least one of the cached source body meshes, a source body mesh having body measurements that are within a threshold difference of the body measurements of the destination body mesh.

9. The non-transitory computer readable medium of claim 8, wherein execution of the instructions causes the device to perform operations further comprising simulating the fitting of the garment based, at least in part, on the identified source body mesh and its corresponding deformable object mesh.

10. The non-transitory computer readable medium of claim 8, wherein execution of the instructions causes the device to perform operations further comprising caching each of the generated deformable meshes, wherein each generated deformable mesh is cached as a binary format file including the vertex positions and body measurements of the deformable mesh.

11. The non-transitory computer readable medium of claim 8, wherein execution of the instructions causes the device to perform operations further comprising building a k dimensional (KD) tree representing the cached at least one source body meshes based, at least in part, on the body measurements of each of the cached at least one source body meshes.

12. The non-transitory computer readable medium of claim 11, wherein the identifying comprises using the KD tree to locate the source body mesh among the selected one or more cached source body meshes having body measurements that most closely match the body measurements of the destination body mesh.

13. The non-transitory computer readable medium of claim 12, wherein the identifying further comprises performing a range search through the KD tree to locate the source body mesh among the selected one or more cached source body meshes having body measurements that most closely match the body measurements of the destination body mesh.

14. The non-transitory computer readable medium of claim 8, wherein execution of the instructions causes the device to perform operations further comprising ordering the selected at least one cached source body meshes based on the body measurements of each of the selected at least one cached source body meshes.

15. A system for reducing the time required to simulate the fitting of a garment over one or more time intervals, the system comprising:

a computing device configured to:

generate a plurality of source body meshes, wherein each source body mesh in the plurality corresponds to a useable body shape;

select at least one of the plurality of source body meshes based, at least in part, on body measurements of a destination body mesh and caching the selected at least one of the plurality of source body meshes;

select at least one of the cached source body meshes based, at least in part, on a wearable measurement range of the garment and generating, for each of the at least one selected cached source body meshes, a deformable object mesh representing the garment, wherein the generating is based, at least in part, on the at least one selected cached source body mesh; and identify, from among the selected at least one of the cached source body meshes, a source body mesh having body measurements that are within a threshold difference of the body measurements of the destination body mesh.

16. The system of claim 15, wherein the computing device is further configured to simulate the fitting of the garment based, at least in part, on the identified source body mesh and its corresponding deformable object mesh.

17. The system of claim 15, wherein the computing device is further configured to cache each of the generated deformable meshes, wherein each generated deformable mesh is cached as a binary format file including the vertex positions and body measurements of the deformable mesh.

18. The system of claim 15, wherein the computing device is further configured to build a k dimensional (KD) tree representing the cached at least one source body meshes based, at least in part, on the body measurements of each of the cached at least one source body meshes.

19. The system of claim 15, wherein the identifying comprises using the KD tree to locate the source body mesh among the selected one or more cached source body meshes having body measurements that most closely match the body measurements of the destination body mesh.

20. The system of claim 15, wherein the computing device is further configured to order the selected at least one cached source body meshes based on the body measurements of each of the selected at least one cached source body meshes.

* * * * *